May 17, 1938.  D. E. MARSHALL  2,117,440
SPEED INDICATING DEVICE FOR VEHICLES
Filed March 12, 1934  2 Sheets-Sheet 1

INVENTOR:
Donald E. Marshall,
BY
ATTORNEY.

May 17, 1938.　　D. E. MARSHALL　　2,117,440
SPEED INDICATING DEVICE FOR VEHICLES
Filed March 12, 1934　　2 Sheets-Sheet 2
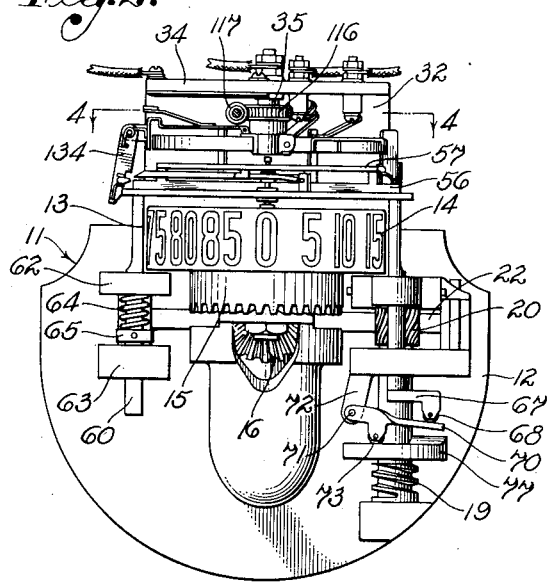
Fig.2.
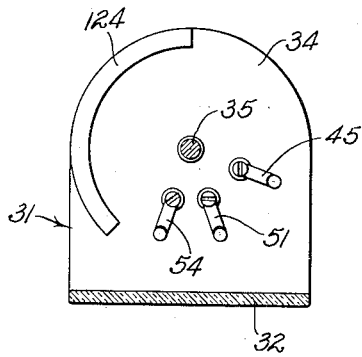
Fig.6.
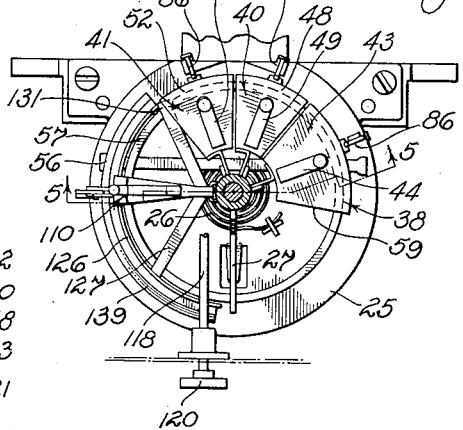
Fig.4.
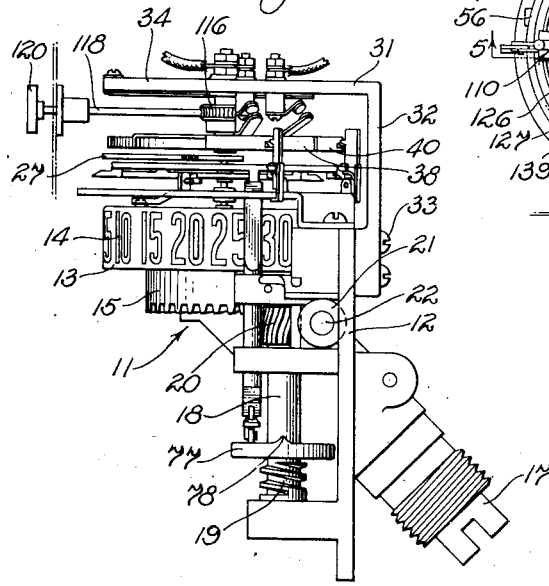
Fig.3.
INVENTOR:
Donald E. Marshall,
By
ATTORNEY.

Patented May 17, 1938

2,117,440

UNITED STATES PATENT OFFICE 2,117,440

SPEED INDICATING DEVICE FOR VEHICLES

Donald E. Marshall, Palos Verdes Estates, Calif.

Application March 12, 1934, Serial No. 715,049

20 Claims. (Cl. 200—56)

My invention relates to speed indicating devices and relates in particular to a device which will display colored lights indicating the velocity of speed of the device to which the invention is connected. The invention is of especial utility with automotive vehicles and may be readily employed with standard types of speedometer mechanism.

It is an object of the invention to provide a device having connection with one or more wheels of the vehicle and having a speed responsive element which changes in position in accordance with the speed at which the vehicle is traveling, this speed responsive element controlling the display of a series of colored lights in such a manner as to indicate by the display of a colored light the range of speed at which the vehicle is traveling. For example, the device may be so constructed and adjusted that a yellow light will be displayed when the vehicle is traveling within the range of speed of twenty to thirty-five miles per hour, and green and blue lights will be respectively displayed when the vehicle is traveling within the range of thirty-five to forty-five miles per hour and forty-five to fifty-five miles per hour. For speeds above fifty-five miles per hour a white light may be displayed, all of the lights being dark when the speed of the vehicle is below twenty miles per hour.

The invention has a number of valuable advantages. It enables the driver of the car to have a constant knowledge of the range of speed in which he is traveling without constantly taking his eyes from the road to search out the figures displayed on the speedometer dial. Also, the invention is especially suited for the display of lights on the exterior of the car in such a manner that they may be seen from all directions so as to advise persons outside the car of the actual speed range in which the car is traveling. For example, where cars are approaching an intersection, one driver may know the speed at which the other car is traveling; pedestrians desiring to cross streets may readily determine the speed of an approaching vehicle; and the public and officers will be immediately advised of an excessive or dangerous speed of travel of any vehicle.

An object of the invention is to provide a device which accomplishes the above objects through use of a simple mechanism adapted for attachment to a standard speedometer in such a manner that the normal functioning of the speedometer will not be interfered with. In its preferred form the invention employs a flexibly mounted control element which is moved by or in accordance with the speed responsive element of the speedometer. This control member or element is preferably in the form of a pointer or bar which normally rides in a free position, that is, without frictional engagement with other parts, and through its position along a defined path of movement controls the operation of a periodic actuating means in closing switches for the proper energization of electric lamps in accordance with the vehicle speed represented by the various positions of the control element along its path of movement.

The operation of the actuating means is of instantaneous character, and in order to maintain proper switches closed during the inactive periods of the actuating means, I employ latch means for holding a switch which has been closed by the cooperation of the actuating means and the control element in closed position until the speed of the vehicle has changed sufficiently to take it out of the speed range represented by the closed switch. The latch means has a simple form of release means operated by the actuating means in such a manner as to release the latch of all switches except the one which may be in conjunction with the control element.

A further object of the invention is to provide a device of the above character having a pacing light for use at high speeds, especially suited for out-of-town roadwork to enable the driver of the automobile to maintain a constant speed without constant reference to the speedometer, thereby enabling him to constantly keep his eyes on the road.

Further objects and advantages of the invention will be made evident throughout the following part of the specification.

Referring to the drawings, which are for illustrative purposes only,

Fig. 2 is a face view of a speedometer mechanism having a preferred embodiment of my invention secured thereto.

Fig. 3 is a side view corresponding to Fig. 2.

Fig. 4 is a cross section on a plane represented by the line 4—4 of Fig. 2.

Fig. 6 is a view looking upwardly from the plane 4—4 of Fig. 2.

Figure 1:
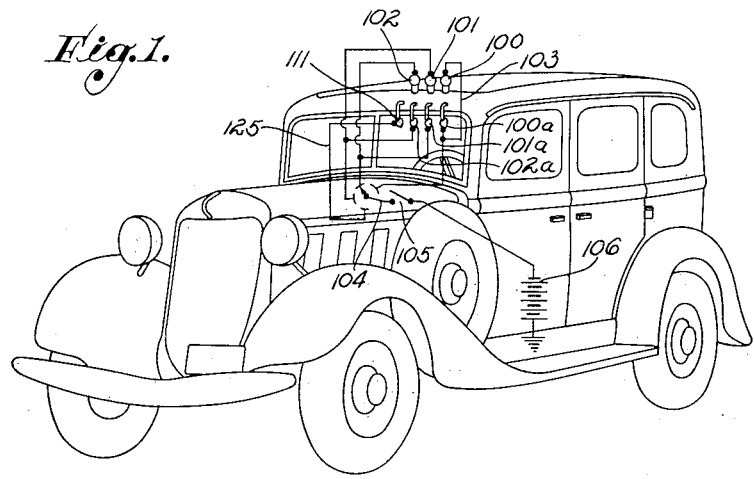
Fig. 1 is a schematic view showing the manner in which the invention may be applied to an automobile.

As shown in the drawings, my invention may be readily employed in conjunction with a standard type of speedometer mechanism 11, such as shown in Figs. 2 and 3, which embodies a supporting structure 12 carrying a speed responsive element 13 of cylindrical form and having numerals 14 thereon for indicating speeds of travel of a vehicle. The speed responsive element 13 may have a magnetic drive linkage with, or may be otherwise driven from, a rotary part 15 adapted to be driven by a gear 16, Fig. 2, mounted on the upper end of a shaft 17 adapted for connection with a flexible shaft which leads to some suitable moving part of the vehicle. In conjunction with such speedometers it is customary to employ a tachometer for registering the distance traveled, and for operation of the tachometer a vertical shaft 18 is provided which has a worm 19 on the lower portion thereof and is driven from the shaft 17 through gears 20 and 21 and a horizontal shaft 22.

Figure 5:
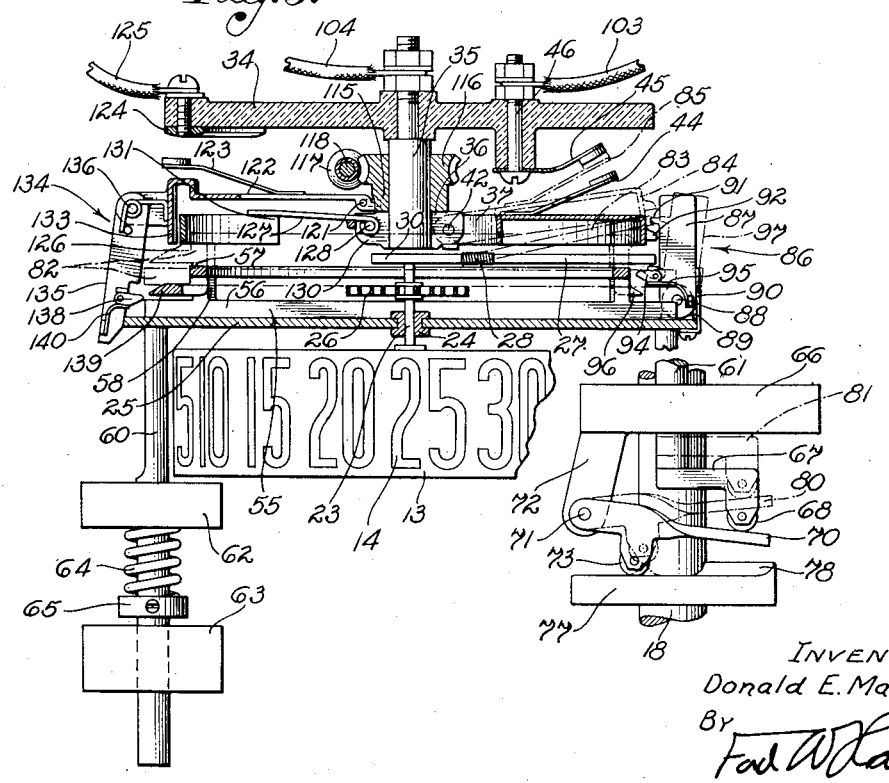
Fig. 5 is an enlarged fragmentary view sectioned as indicated by the line 5—5 of Fig. 4.

The movement of the speed responsive element 13 is proportionate to the speed at which the vehicle travels, and the shaft 23 which extends upwardly therefrom through a bearing 24 in a horizontal plate 25, as shown in Fig. 5, has also an angular movement proportionate to the speed of the vehicle. On the upper portion of the shaft 23 above the spring 26 which is ordinarily employed therewith to exert a counter-rotative force on the speed responsive element 13, I mount a control element 27 which is in the form of a finger or pointer connected through use of a spring 28 with a member 30 secured to the upper end of the shaft 23. The control element, through use of the spring 28, is flexibly mounted, and the spring 28 has the individual convolutions thereof in close engagement so that flexure of the spring is resisted with sufficient force to hold the finger or control element 27 in horizontal position, as shown in Fig. 5, in which it touches or engages no part of the device except the spring 28 by which it is secured to the part 30. Accordingly, the finger 27 is free to swing in accordance with the angular movement of the speed responsive element 13 without in any way interfering with the movement of the member 13.

Secured to the supporting structure 12 is a bracket 31 comprising a vertical wall 32 of insulating material, through which screws 33 pass into engagement with the support 12, and a horizontal wall 34 of insulating material, such as Bakelite, extending forwardly from the upper edge of the vertical wall 32 and supporting a post member 35 in downwardly projecting position and in axial alignment with the shaft 23, the lower end of the member 35 being in relatively close relation to the member 30 mounted on the upper end of the shaft 23. Extending radially from the lower portion of the post 35 are brackets or stationary hinge plates 36 to which hinge members 37 of switch means 38, 40, and 41 are pivotally secured by means of horizontal hinge pins 42. The switch means 38 includes a vertically swingable body 43, which for maintaining lightness in the structure is preferably of inverted channel-shaped form, a spring contact 44, and a stationary contact 45 mounted on the lower end of a screw or binding post 46 supported by the wall 34. In a like manner the switch means 40 includes a vertically swingable body 48, a movable contact 49 thereon, and a stationary contact 51 carried by the wall 34. The switch means 41 comprises a vertically movable body 52 having a movable contact 53 mounted thereon in position to engage a contact 54 supported also by the wall 34. The bodies 43, 48, and 52 are of sector form and have an angular dimension proportionate to a selected speed range. In Fig. 4 the finger 27 is shown in zero position. As the speed responsive element 13 is actuated, the finger 27 moves therewith in a counter-clockwise direction. The body 43 may be so placed that the finger 27 will reach the forward edge 59 thereof when the speed of the vehicle arrives at the value of twenty miles per hour, and the body 43 may be of such angular dimension as to lie over the space through which the finger 27 travels during the change in the speed of the vehicle from twenty to thirty-five miles per hour. As the speed increases above thirty-five miles per hour, and until it reaches forty-five miles per hour, the finger 27 will be under the body 48, and between the speeds of forty-five and fifty-five miles per hour the finger 27 will be under the body 52.

Mounted on the upper face of the horizontal wall 25 I provide an actuating or thrust member 55 comprising a horizontal bar 56 having a thrust ring 57 mounted thereon by means of vertical webs or posts 58, there being bar members 60 and 61 extending downwardly from the ends of the horizontal bar 56. The bar member 60 extends through a pair of guides 62 and 63, and for urging the actuating means 55 downwardly, a compression spring 64 is placed around the bar 60 below the guide 62 and is adapted to bear against a collar 65 which is secured to the bar 60. The bar 61 extends through guide means 66 and has a laterally extending bracket 67 provided with a roller 68 which rests upon a lever 70 pivotally secured by means of a hinge pin 71 to a stationary bracket 72 which projects downwardly from the member 66. On the lower part of the lever 70 in a position near the hinge pin 71, a roller 73 is mounted in a position to engage the upper face of a cam 77 which is mounted on the shaft 18, which shaft 18 has also the function of driving the screw 19 constituting a part of the operating mechanism for a tachometer or mileage indicator, not shown. The upper face of the cam 77 is substantially flat with the exception of a small radial hump 78 thereon which is adapted to periodically engage the roller 73 and move the lever 70 upwardly to a position such as indicated by dotted lines 80 in Fig. 5. Through the leverage of the lever 70 the vertical movement of the roller 73 is multiplied, and consequently the bracket 68 is moved upwardly through a larger distance into a position indicated by broken lines 81. Since the bracket 67 is secured to the lower end of the vertical bar 61, the actuating means 55 will be raised from the lowered position in which it is shown in full lines to the dotted line position 82 thereof, with the result that the thrust ring 57 will engage the flexibly secured finger 27 and swing the same upwardly as indicated by dotted lines 83. Should the finger 27, at the time of the upward movement of the thrust ring 57, be under a body 43, 48, or 52, such body will be raised and the switch means of which it forms a part will be actuated.

Assuming that the vehicle is traveling at a speed of between twenty and thirty-five miles per hour, the upward flexure of the finger 27 will result, as shown in dotted lines 84 of Fig. 5, in the swinging of the body 43 into raised position by reason of the fact that the finger or control element 27 provides a means for transmitting the movement of the thrust ring 57 to the body 43. The upward movement of the body 43 carries the contact 44 thereon into engagement with the stationary contact 45, as indicated by dotted lines 85, such contact of the members 44 and 45 serving to close an electrical circuit for operating a suitable indicating or signal device, such, for instance, as an electric lamp, as will be hereinafter explained in detail.

The cam 77 may be so designed and may be rotated at such speed that the switch actuating means will be operated once every one-eighth mile of travel of a vehicle to which the device is attached. My invention provides latch means 86 for holding the actuated switch means 38, 40, or 41 in actuated condition. As best shown in Fig. 5, each of these latch means 86 comprises a plate 87 hinged by means of a tangential pin 88 to a lug 89 projecting upwardly from the plate 25 so as to swing outwardly against the action of a spring 90 in a radial plane. On the upper inner edge of the plate 87 is a catch 91 adapted to be engaged by a projecting dog 92 carried by a member 43, 48, or 52 so that when such member, as indicated by dotted lines 84 in Fig. 5, is lifted into raised position, there will be a co-engagement of the catch 91 with the dog 92 providing a latch for holding the switch means in closed relation until the latch is released. For releasing the latch means 86, each plate 87 is provided with a swingable dog or cam 94 which is held yieldably in projecting position by a spring 95 where it may be engaged by a projecting dog 96 formed on the ring 57. As the ring 57 is raised, the cam 94 of each latch means 86 is engaged by a projection or lug 96, with the result that all of the plates 87 are simultaneously swung out into positions such as indicated by dotted lines 97 in Fig. 5, carrying all of the latch members 91 out of engagement with the dogs 92 cooperating therewith so as to release all of the latches 86. The lugs 96 engage the cams 94 during the first part of the upward movement of the ring 57 and pass upwardly beyond the cams 94 so that all of the latch plates 87 swing inwardly while the ring 57 is in raised position. When the lugs 96 move downwardly from raised position, the cams 94 rotate in anti-clockwise direction, and accordingly the plates 87 are not again moved outwardly. The member 43, 48, or 52 which has been engaged and raised by the finger 27 will therefore be latched in raised position, and any other member 43, 48, or 52 which has been previously held in latched position will be released by the releasing action of the projections 96. From the foregoing it will be perceived that each time the cam 77 operates to raise the ring 57, a releasing action of the latches 86 will be accomplished, but whichever of the members 43, 48, or 52 is raised by the control element or finger 27 will be relatched in raised position during the intervening period before the next operation of the cam 77.

The foregoing description indicates the manner in which the respective switch means 38, 40, and 41 are actuated during specific speed ranges. It is an object of my invention to provide colored lamps 100, 101, and 102 on the exterior of the vehicle in such a position that they may be seen from the front and also from the rear, these lights being connected through conductors 103 with the switch means 38, 40, and 41 which are in turn connected through a conductor 104 and a manual control switch 105 with a power source such as the battery 106 of the automobile. Connected in parallel with the lamps 100, 101, and 102 are lamps 100a, 101a, and 102a disposed within the automobile so as to be readily viewed by the driver, these latter lamps being preferably in such position that they may be seen by the driver without the necessity of his taking his vision from the road. With an arrangement such as shown, the control element 27, during the time it is passing through the arc lying under the member 43, will cause actuation of the switch means 38 with the result that the lamps 100 and 100a will be illuminated during the low range of speed of the vehicle, for example, twenty to thirty-five miles per hour, and as the control element 27 passes under the members 48 and 52, the switch means 40 and 41 will be respectively actuated so as to cause illumination of the lamps 101—101a and 102—102a in their proper order.

A further feature of my invention is to provide a movable switch means 110 for control of a pacing light 111 placed in a position to be visible by the driver of the vehicle, this pacing light being used for the purpose of maintaining the vehicle at a definite high speed during travel over country roads. As shown in Figs. 4 and 5, a collar 115 is mounted on the post 35 above the members 36 and has a worm gear 116 formed thereon for engagement by a double-thread worm 117 mounted on a shaft 118 which projects forwardly and has a knob 120 on the forward end thereof for the purpose of manual adjustment. By means of a hinge 121 a relatively narrow member 122 is secured in radially extending position, this member 122 having a spring contact 123 thereon adapted to engage an arcuate contact 124 supported on the under side of the member 34 and being connected through a conductor 125 with the pacing lamp 111. Mounted under the outer portion of the member 122 is an arcuate member 126 carried by a horizontal plate portion 127 pivotally connected by means of a hinge pin 128 to a radially extending stationary hinge plate 130 which projects radially from the lower end of the post 35. The rightward end 131 of the arcuate member 126 projects under the leftward portion of the body 52 of the switch means 41 so that whenever the finger 27 moves beyond the leftward extremity of the body 52, the upward movement of the ring 57 will cause the finger 27 to engage the arcuate member 126 and raise the same, the rightward end 131 thereof raising the body 52 and actuating the switch means 41. By rotating the collar 115 through use of the worm 117, the member 122 may be swung through an arc beyond the leftward edge of the body 52 so as to be set at pacing speeds, for example, fifty-eight, sixty, and sixty-two miles per hour, etc. The member 122 has a downwardly projecting end 133 adapted to be engaged by the control element or pointer 27 when such pointer 27 is lifted thereunder, which occurs when the speed of the vehicle is within the range of speed indicated by the position of the member 122. The member 122 carries a latch means 134 comprising a plate 135 hinged at 136 to the end of the member 122 in such a manner that when the member 122 is raised, the lower extremity of the plate 135 will swing inwardly and rest upon the leftward edge of the wall 25. The latch means 134 moves with the member 122 as such member is swung by the rotation of the collar 115, and the plate 135 thereof is provided with a cam 138 which is engaged by an annular projection 139 formed on the ring 57 so that whenever the ring 57 moves upwardly, the engagement of the lug 139 with the cam 138 will cause the plate 135 to be swung outwardly to return toward latching position when the lug 139 passes into a position above the cam 138. When the lug 139 moves downwardly, the cam 138 will swing in clockwise direction against the action of a spring 140 so as to permit the lug 139 to move downwardly without forcing the plate 135 outwardly.

The pacing device above described causes the pacing lamp 111 to be illuminated whenever the vehicle is traveling at the pacing speed for which the member 122 is set, and the lifting of the arcuate member 126 will at the same time cause actuation of the switch means 41 and the consequent illumination of the high speed lamps 102 and 102a.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. In combination with a speed responsive device for automotive vehicles: a control element connected to said speed responsive device in a manner to be moved angularly thereof; switch means disposed above said control element; actuating means functioning to operate said switch means respectively as said control element is moved into conjunction with the switches thereof; latch means for each of the switches for holding said switches in operated position; and releasing means operated by said actuating means so as to release the remaining of said switches when one of said switches is actuated in conjunction with the operation of its associated latch means under control of said control element.

2. In combination with a speed responsive device for automotive vehicles: a control element connected to said speed responsive device in a manner to be moved thereby; elongated fixed switch means disposed above said control element in a position substantially parallel to the line of travel of said control element; a movable switch means supported for movement below said fixed switch means; means for moving said movable switch means through consecutive positions relative to said fixed switch means; and actuating means functioning to operate said switch means respectively as said control element is moved into position of conjunction therewith.

3. In combination with a speed responsive device for automotive vehicles: a control element connected to said speed responsive device in a manner to be moved angularly thereof; fixed switch means disposed above said control element; a movable switch means supported below said fixed switch means; means for moving said movable switch means through consecutive positions relative to said fixed switch means; actuating means functioning to operate said switch means respectively as said control element is moved into position of conjunction therewith; latch means for each of the switches for holding said switches in operated position; and releasing means operated by said actuating means so as to release the remaining of said switches when one of said switches is actuated in conjunction with the operation of its associated latch means under control of said control element.

4. In combination with a speed responsive device for automotive vehicles: a control element connected to said speed responsive device in a manner to be moved thereby; a movable switch means supported for movement above said control element; means for moving the switches of said movable switch means through consecutive positions; and actuating means functioning to operate the said switches respectively as said control element is moved into position of conjunction therewith.

5. In combination with a speed responsive device for automotive vehicles: a control element connected to said speed responsive device in a manner to be moved angularly thereof; a movable switch means supported for movement above said control element; means for moving said movable switch means through consecutive positions; actuating means functioning to operate the respective switches of said switch means as said control is moved into position of conjunction therewith; latch means for holding the movable switches in operated position; and release means operated by said actuating means for releasing said latch means.

6. In combination with a speed responsive device for automotive vehicles: a control element connected to said speed responsive device in a manner to be moved angularly thereof; switch means disposed above said control element; actuating means for the switches of said switch means, said actuating means being adapted to pass through a cycle of operation; and means connected with said speed responsive device for periodically causing said actuating means to pass through said cycle of operation.

7. In combination with a speed responsive device for automotive vehicles: a control element connected to said speed responsive device in a manner to be moved thereby; switch means disposed above said control element; actuating means for the switches of said switch means, said actuating means being adapted to pass through a cycle of operation; means connected with said speed responsive device for periodically causing said actuating means to pass through said cycle of operation; latch means for each of the switches for holding the switches in operated position; and releasing means operated by said actuating means so as to release the remaining of said switches when one of said switches is actuated in conjunction with the operation of its associated latch means under control of said control element.

8. In combination with a speed responsive device for automotive vehicles: a control element connected to said speed responsive device in a manner to be moved thereby; fixed switch means disposed above said control element; a movable switch means supported for movement below said fixed switch means; means for moving said movable switch means through consecutive positions relative to said fixed switch means; actuating means for said switch means, said actuating means being adapted to pass through a cycle of operation; means connected with said speed responsive device for periodically causing said actuating means to pass through said cycle of operation; latch means for each of the switches of said switch means for holding the switches in operated position; and releasing means operated by said actuating means so as to release the remaining of the switches when one of said switches is operated in conjunction with the operation of its associated latch means under control of said control element.

9. In combination with a speed responsive device for automotive vehicles: a control element connected to said speed responsive device in a manner to be moved angularly thereof; a movable switch means supported for movement above said control element; means for moving said movable switch means through consecutive positions; actuating means for said switch means, said actuating means being adapted to pass through a cycle of operation; means connected to said speed responsive device for periodically causing said actuating means to pass through said cycle of operation; latch means for holding the individual switches in operated position; and releasing means operated by said actuating means for releasing the remaining of said switches.

10. In combination with a speed control device for automotive vehicles: a control element comprising a flexibly supported member connected to said speed responsive device in a manner to be moved thereby; switch means disposed above said control element; a thrust member disposed opposite said switch means; and means for periodically moving said thrust member toward said switch means so that said control element will be moved into actuating engagement with the switch means in conjunction therewith.

11. In combination with a speed responsive device for automotive vehicles: a control element comprising a flexibly supported member connected to said speed responsive device in a manner to be moved thereby; switch means disposed above said control element; a thrust member disposed opposite said switch means; means for periodically moving said thrust member toward said switch means so that said control element will be moved into actuating engagement with the switch means in conjunction therewith; and latch means for each of the switches to hold the same in operated position, there being releasing means operative in conjunction with said thrust member for releasing said latch means before said thrust member has reached the end of its movement toward said switch means.

12. In combination with a speed responsive device for automotive vehicles: a control element connected to said speed responsive device so as to be moved thereby; switch means disposed along the line of travel of said control element; means for actuating said switch means, said actuating means being adapted to pass through a cycle of operation; means connected to said speed responsive device for periodically causing said actuating means to pass through said cycle of operation; latch means for each of the switches for holding said switches in operated position; and means operated by said actuating means for releasing the remaining of the switches when one of said switches is actuated in conjunction with the operation of its associated latch means under control of said control element.

13. In combination with a speedometer mechanism: a control element consisting of a flexibly supported member connected to said speedometer mechanism in a manner to be moved thereby; switch means disposed along the line of travel of said control element; thrust means disposed adjacent to said switch means; means for periodically moving said thrust means toward said switch means so that said control element will be moved into actuating engagement with said switch means in conjunction therewith; means for holding one of said switches in operated position; and releasing means operative in conjunction with said thrust means for releasing the remaining switches before said thrust means has reached the end of its movement toward said switches.

14. In combination with a speed responsive device for automotive vehicles: a control element connected to said speed responsive device so as to be moved thereby; a movable switch disposed along the line of travel of said control element; means for moving said movable switch along said line of travel; and means for operating said movable switch when said control element is moved into a position of conjunction therewith.

15. In combination with a speed responsive device for automotive vehicles: a control element connected to said speed responsive device in a manner to be moved along a line of travel; operable means disposed along said line of travel; actuating means functioning to operate said operable means as said control element is moved into conjunction therewith; holding means operating to hold said operable means in operated state after said operable means has been operated by said actuating means; and means operative to subsequently release said holding means.

16. In combination with a speed responsive device for automotive vehicles: a control element connected to said speed responsive device in a manner to be moved along a line of travel; operable means disposed along said line of travel; actuating means functioning to operate said operable means as said control element is moved into conjunction therewith; holding means operating to hold said operable means in operated state after said operable means has been operated by said actuating means; and means operative in timed relation to the distance of travel of the vehicle to subsequently release said holding means.

17. In combination with a speed responsive device for automotive vehicles: a control element connected to said speed responsive device in a manner to be moved along a line of travel; operable means disposed along said line of travel; actuating means functioning to operate said operable means as said control element is moved into conjunction therewith; holding means operating to hold said operable means in operated state after said operable means has been operated by said actuating means; and means operative independently of the speed of the vehicle to release said holding means.

18. In combination with a speed responsive device for automotive vehicles: a control element connected to said speed responsive device in a manner to be moved along a line of travel; operable means disposed along said line of travel; actuating means functioning to operate said operable means as said control element is moved into conjunction therewith, said actuating means passing through a cycle of operation; holding means operating to hold said operable means in operated state after said operable means has been operated by said actuating means; and means operative intermittently by said actuating means to release said holding means.

19. The combination with a speed-responsive device for automotive vehicles of: a signal-controlling switch; a control member for said switch adjustable through positions representative of vehicle speeds; a switch-actuating means adapted for periodic operation out of range of said control member; and means operatively associated with said speed-responsive device to be moved thereby through a range of speed-indicative positions adjacent the positions of said control member and adapted when registered with said control member to operatively relate said switch-actuating means therewith.

20. In combination with a speed responsive device having a moving part which moves through consecutive positions in accordance with the speed of a vehicle and having a rotating part connected so as to rotate in timed relation to the wheels of the vehicle: a signal controlling means in operative position relative to said speed responsive device; means for actuating said signal controlling means when said moving part reaches a predetermined position; and individual means operating to hold said signal controlling means in actuated condition for a period of time after its actuation by said actuating means.

DONALD E. MARSHALL.